(12) United States Patent
Sasaki et al.

(10) Patent No.: US 8,166,926 B2
(45) Date of Patent: May 1, 2012

(54) INTERNAL COMBUSTION ENGINE WITH AMMONIA FUEL

(75) Inventors: Shizuo Sasaki, San Antonio, TX (US); Jayant Sarlashkar, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 599 days.

(21) Appl. No.: 12/464,636

(22) Filed: May 12, 2009

(65) Prior Publication Data

US 2010/0288249 A1 Nov. 18, 2010

(51) Int. Cl.
*F02B 43/00* (2006.01)
*F02B 13/00* (2006.01)

(52) U.S. Cl. .............................. 123/1 A; 123/3; 123/575

(58) Field of Classification Search ................... 123/1 A, 123/2, 3, 575
See application file for complete search history.

(56) References Cited

U.S. PATENT DOCUMENTS

| 6,073,862 A | * | 6/2000 | Touchette et al. ............. 239/408 |
| 6,936,363 B2 | | 8/2005 | Kordesch et al. |

* cited by examiner

*Primary Examiner* — Noah Kamen
(74) *Attorney, Agent, or Firm* — Grossman, Tucker et al

(57) ABSTRACT

The invention provides methods of providing fuel to an internal combustion engine, fuel systems for an internal combustion engine and a fuel injector for an internal combustion engine. Ammonia may be heated and pressurized to a selected condition and may used as fuel which is supplemented with hydrogen to assist with ignition, flame propagation, and/or combustion speed.

25 Claims, 3 Drawing Sheets

INTERNAL COMBUSTION ENGINE WITH AMMONIA FUEL

FIELD OF THE INVENTION

The present invention relates to an internal combustion engine for a motor vehicle, such as an automobile or truck, which is fueled with ammonia at selected temperature and pressure conditions. The ammonia may be combined with hydrogen to improve combustion, and the hydrogen may itself be sourced directly from the ammonia feed.

BACKGROUND

While hydrogen ($H_2$) has been proposed for use as an alternative fuel for internal combustion engines, hydrogen's physical properties make it difficult to handle. Hydrogen's low energy density and atomic weight makes storage and transport expensive.

Anhydrous ammonia ($NH_3$), on the other hand, stores and handles very much like liquefied petroleum gas (LPG). For example, ammonia has a boiling temperature of about −33.5° C. at 1.013 bar (1 atmosphere). Similarly, propane, the main constituent of (LPG) has a boiling temperature of about −42.1° C. Furthermore, ammonia is carbon free and renewable in addition to being reasonably practical to handle, store and transport.

Also, from an energy density standpoint, ammonia is much better than even liquefied hydrogen. On a volume bases, the energy density of liquefied hydrogen is about 8,491 kJ/liter compared to liquefied ammonia having an energy density of about 11,308 kJ/liter.

As indicated by its chemical formula, $NH_3$, ammonia is one (1) part nitrogen and three (3) parts hydrogen. By atomic weight, ammonia is fourteen (14) parts nitrogen to three (3) parts hydrogen, or approximately 82% nitrogen to 18% hydrogen. However, while ammonia is only 18% hydrogen, the fact that there are 3 hydrogen atoms attached to a single nitrogen atom allows ammonia to contain significantly more hydrogen by volume than even liquefied hydrogen.

However, one problem with ammonia is flame propagation. Ammonia has a minimum ignition energy of about 680 mJ. By contrast, hydrogen has a minimum ignition energy of about 0.011-0.017 mJ and gasoline has a minimum ignition energy of 0.8 mJ. Consequently, the flame propagation speed of ammonia/air mixture is slow and it is difficult to realize high cycle efficiency because of the long combustion duration.

To maximize the benefit of ammonia as a fuel for internal combustion engines, a fuel injector, a fuel system and method of providing fuel to an internal combustion engine are disclosed that includes producing a certain percentage of hydrogen from ammonia itself to accelerate ammonia combustion.

SUMMARY

According to one aspect of the present invention, a method of providing fuel to an internal combustion engine is provided which comprises providing liquid ammonia; converting the liquid ammonia to ammonia at a selected temperature and pressure; dissociating a portion of the ammonia into hydrogen and nitrogen; and introducing the ammonia and the hydrogen as fuel to the internal combustion engine. In certain embodiments, the method further comprises producing exhaust gas from the internal combustion engine and heating the ammonia with the exhaust gas to provide the ammonia at a selected temperature and pressure. In other embodiments, the method comprises heating the ammonia with the exhaust gas to dissociate a portion of the ammonia into hydrogen and nitrogen and separating the ammonia from the hydrogen and nitrogen and separately introducing the ammonia and hydrogen/nitrogen mixture to the internal combustion engine.

Heating the ammonia with the exhaust gas may be performed within a reaction vessel configured to withstand a selected combination of temperature and pressure sufficient to dissociate all or of a portion of the ammonia into hydrogen and nitrogen. Heating the ammonia with the exhaust gas may be performed with a heat exchanger.

Introducing the ammonia at a selected temperature and pressure to the internal combustion engine may be performed through at least one fuel injector. The fuel injector may provide the ammonia directly to a cylinder of the internal combustion engine.

Introducing the hydrogen to the internal combustion engine may also be performed through at least one fuel injector. The fuel injector may provide the hydrogen through an air intake port of the internal combustion engine.

Introducing the ammonia and the hydrogen as fuel to the internal combustion engine may be performed through at least one fuel injector configured to introduce both the heated and pressurized ammonia and the hydrogen as fuel to the internal combustion engine. The fuel injector may provide the ammonia and hydrogen directly to a cylinder of the internal combustion engine, and may provide the ammonia and hydrogen through a shared nozzle. Furthermore, the fuel injector may separately introduce the ammonia and the hydrogen as fuel to the internal combustion engine separately.

According to another aspect of the present invention, a fuel system for an internal combustion engine is provided which comprises a fuel tank to store liquid ammonia; a fuel tank supply line to deliver the liquid ammonia from the fuel tank to a reaction vessel, with the reaction vessel configured to withstand a combination of temperature and pressure sufficient to provide the ammonia at a selected temperature and pressure and to dissociate all or a portion of the ammonia into hydrogen and nitrogen. A first fuel supply line is provided to supply the ammonia from the reaction vessel to the internal combustion engine and a second fuel supply line is provided to transfer the hydrogen from the reaction vessel to the internal combustion engine. The fuel system may optionally include a third fuel supply line to provide hydrogen from the reaction vessel to a hydrogen fuel cell.

The internal combustion engine noted herein may also include a fuel delivery device and the fuel delivery device may include at least one fuel injector to provide the ammonia to the internal combustion engine at a selected temperature and pressure, with the at least one fuel injector comprising a direct fuel injector. In other embodiments the fuel delivery device comprises at least one fuel injector to provide the hydrogen to the internal combustion engine, with the at least one fuel injector comprising an indirect fuel injector.

In still other embodiments, the fuel delivery device comprises at least one fuel injector to provide the ammonia and the hydrogen to the internal combustion engine. The at least one fuel injector may alternate between: (1) providing the ammonia at a selected temperature and pressure to the internal combustion engine; and (2) providing the hydrogen to the internal combustion engine, with the at least one fuel injector comprising a direct fuel injector.

According to another aspect of the present invention, a fuel injector for an internal combustion engine is provided which comprises a first fuel passage to deliver a first fuel to the internal combustion engine and a second fuel passage to deliver a second fuel to the internal combustion engine. The fuel injector may include a first fuel passage valve and a second fuel passage valve and an actuator configured to actuate the first fuel passage valve and actuate the second fuel passage valve. In certain embodiments, the actuator comprises an electromechanical solenoid having a solenoid coil and a solenoid armature.

In certain embodiments, the actuator may be configured to open the first fuel passage valve and open the second fuel passage valve, and may be further configured to travel in a first direction to actuate the first fuel passage valve and to travel in a second direction to actuate the second fuel passage valve. The first direction and the second direction may be opposing directions.

The actuator may also be configured to actuate the first fuel passage valve against a biasing force of a first spring and actuate the second fuel passage valve against a biasing force of a second spring.

In certain embodiments, the fuel injector may further comprise a first closure means to close the first fuel passage valve and a second closure means to close the second fuel passage valve, with the first closure means comprising a first valve spring and the second closure means comprising a second valve spring.

The fuel injector may further comprise an injection nozzle and the first fuel passage and the second fuel passage may merge in the injection nozzle. The first fuel may comprise ammonia at a selected temperature and pressure and the second fuel may comprise hydrogen.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
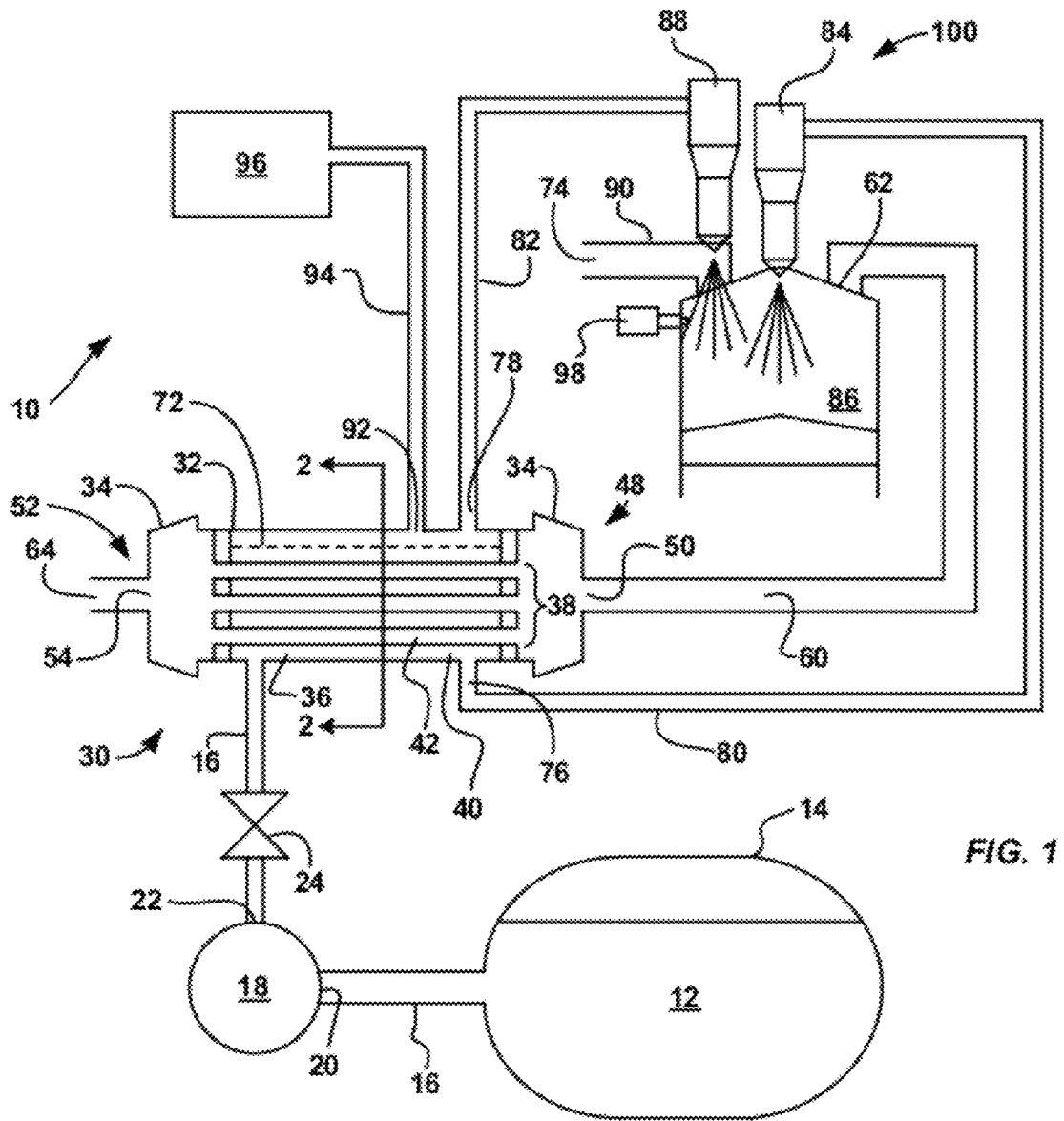
FIG. 1 shows a first embodiment of a fuel system of the present invention.

Throughout the description, like reference numerals and letters indicate corresponding structure throughout the several views. Also, any particular feature(s) of a particular exemplary embodiment may be equally applied to any other exemplary embodiment(s) of this specification as suitable. In other words, features between the various exemplary embodiments described herein are interchangeable as suitable, and not exclusive.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The invention provides methods of providing fuel to an internal combustion engine and fuel systems for an internal combustion engine and a fuel injector for an internal combustion engine. The ammonia may be used as a fuel at selected temperature and pressure conditions which may be supplemented with the use of hydrogen to assist with ignition, flame propagation, and combustion speed. Furthermore, one may utilize heat from the exhaust gas of an internal combustion engine, which is ordinarily lost without contribution to the efficiency of the engine, to provide ammonia in a selected temperature and pressure condition before introduction into an engine cylinder.

Direct injection of ammonia at a selected temperature and pressure into the cylinder of the engine may result in the ammonia expanding along with an increase in cylinder pressure and increases effective energy. This may now be achieved under conditions close to adiabatic expansion of the ammonia, which may be understood as that situation wherein 95% to 99.9% of the heat that may be released by the ammonia is retained by the ammonia and not transferred from the ammonia to the surroundings (e.g. other gases and/or engine components in contact with the ammonia). Accordingly, the temperature of ammonia may be kept above its condensation temperature (e.g. 80° C. at 40 bar) with the latent heat released by the ammonia not being absorbed by the aforementioned surroundings. Therefore, the temperature of the ammonia in the cylinder after injection may be maintained high enough to avoid water condensation A convenient source of heat from the exhaust gas may be used to dissociate a portion of the ammonia into hydrogen ($H_2$) and nitrogen ($N_2$), with the resulting hydrogen subsequently introduced into an intake manifold or cylinder of the engine before, or after, or at the same time as ammonia introduction into the cylinder. Such hydrogen may then be used to assist ignition, which may be accomplished by an ignition (spark) plug and to accelerate combustion. Accordingly, the present disclosure may provide for the combustion of a given hydrogen/ammonia mixture, where one does not need to separately supply hydrogen for the disclosed combustion cycle.

The inventions disclosed herein therefore provides, among other things, fuel systems, fuel injectors and methods of providing fuel to an internal combustion engine. The inventions will now be discussed with reference to the figures, with FIGS. 1 and 2 showing a first embodiment of a fuel system 10 of the present invention.

Figure 2:
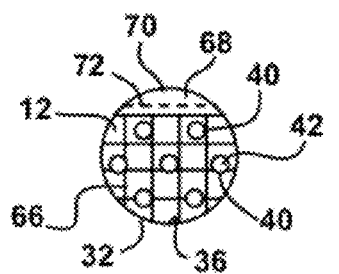
FIG. 2 shows a cross-sectional view of the vessel of FIG. 1.

As shown in FIG. 1, anhydrous ammonia 12 may be stored in its liquid phase in fuel tank 14 under such pressure and temperature conditions to inhibit vaporization. Exemplary storage conditions may include a storage pressure of 10-15 bar (145-218 psi.) at a room temperature of 25° C. For motor vehicle use, however, ambient temperatures may vary, for example, from −40° C. to 50° C. Thus, to provide for use at 50° C., the operating storage pressure of fuel tank 14 may be increased to greater than about 20.3 bar (295 psi). Furthermore, to provide for safety, it may be desirable for exemplary fuel tank 14 to be leak proof to pressures which are double the operating pressure. Thus, in certain embodiments fuel tank 14 may provide an operating storage pressure of at least about 40-50 bar (585-725 psi.).

From fuel tank 14, the liquid ammonia 12 is then pumped out of the tank 14 and delivered through a fuel tank supply line 16 with a supply pump 18. Among other things, pump 18 may be configured to receive ammonia 12 at up to 50 bar on its inlet side 20 and provide an operating pressure of 112 bar or higher, e.g. operating pressures of 112 bar (1624 psi) to 600 bar (8,700 psi), including all values therein in 1 bar (14.5 psi) increments. Accordingly, pump 18 may be configured to provide an operating pressure above the critical pressure of ammonia 12 within vessel 30. The critical pressure of ammonia is 112 bar (1624 psi) and the critical temperature is 132° C.

After passing from the low pressure side 22 of the supply pump 18 to the high pressure side 22 of the supply pump 18, the ammonia travels through supply line 16, which may include a one way or anti-back flow valve 24, and enters a high temperature and pressure reaction vessel 30, preferably in the form of an elongated, here tubular, shell 32 which may comprise a circular tube such as provided by a hollow, cylindrical, linear, metal (steel), high pressure delivery pipe. Each end of the elongated shell 32 of delivery vessel 30 may be capped with a high-pressure end cap, fitting or other suitable closure 34, or merely be crimped, rolled and welded closed, to seal the ends of reaction vessel 30.

Within the reaction chamber 36 of vessel 30 is a heat exchanger 38. In other words, a device which transfers heat from one medium to another, where the media are separated and not allowed to directly mix, by a wall therebetween which transfers heat from one media to the other media. Here, as explained below, the heat exchanger 38 may transfer heat from exhaust gas 60 of the internal combustion engine 100 to the ammonia 12 within the reaction chamber 36.

The heat exchanger 38 comprises at least one hollow heat transfer member 40 having an enclosed passage 42 which is to contain a heating medium (i.e. exhaust gas 60). The heat exchanger 38 may extend longitudinally within the reaction chamber 36 from a first end inlet portion 48 of the reaction vessel 30, where it receives the heating medium though a heat exchanger inlet aperture 50 in closure 34 at one end of the elongated shell 32 to an oppose end outlet portion 52 of the reaction vessel 30, where the heating medium is discharged through a heat exchanger outlet aperture 54 in the closure 34 at the opposite end of elongated shell 32. Outside the elongated shell 32, the heat exchanger inlet aperture 50 is in fluid communication with an exhaust port 62 of the internal combustion engine 100, which may include an exhaust manifold, while the heat exchanger outlet aperture 52 is in fluid communication with the exhaust outlet 64 (e.g. exhaust tail pipe) for the internal combustion engine 100.

Here, as shown, the heat transfer member 40 of heat exchanger 38 may comprise at least one elongated, here tubular, member which may also comprise a circular tube such as provided by a hollow, cylindrical linear, metal (steel), high pressure delivery pipe, which extends longitudinally within the elongated shell 32. As shown, the elongated heat transfer member 40 has an outer diameter smaller than the inside diameter of the elongated shell 32 so that it may fit within the confines of the elongated shell 32. Moreover, as shown, the elongated heat transfer member 40 may have a diameter small enough for a plurality of elongated heat transfer members 40 may fit within the elongated shell 32.

In addition to heat exchanger 38, vessel 30 further includes a catalyst 66, as shown in FIG. 2 which may be positioned on the surfaces of a grid, to promote the dissociation of ammonia 12 into hydrogen and nitrogen and a barrier 72 to separate the hydrogen and nitrogen from to ammonia as discussed in greater detail below. The catalyst may be a metallic catalyst, including catalysts utilizing ruthenium or iridium, as well as metallic alloys that may include Fe—Al—K, Fe—Cr, La—Ni, La—Ni—Pt, La—Co and La—Co—Pt. In addition, one may utilize Ni or Ni alloys.

Once in the reaction chamber 36 of the reaction vessel 30, the ammonia 12, in the presence of a catalyst 66, may be heated by exhaust gas 60 traveling within heat transfer member 40. The reaction vessel 20 may be configured to withstand a combination of temperature and pressure sufficient to convert liquid ammonia 12 to exceed the critical point of the ammonia 12 noted above (132° C. and 112 bar) along with dissociation of a portion of the ammonia 12 into free hydrogen 68 and nitrogen 70. Exemplary conditions of temperature and pressure for the ammonia include temperatures greater than or equal to 300° C. and at a pressures of greater than or equal to 112 bar (1624 psi). For example, the temperatures may be 300° C. to 600° C. and the pressures may be 112-600 bar (1,624-8,700 psi). The dissociation of ammonia may then produce hydrogen and nitrogen with the assist of the catalyst according to the following equation, wherein the indicated equilibrium reaction may be shifted 5.0% or more to the right to provide the indicated nitrogen and hydrogen gases:

$$2.NH_3 \leftrightarrow 2.N_2 + 3.H_2$$

Within the reaction vessel 30, a barrier 72 is provided, which may provided with suitable porosity through which the free hydrogen 68 and nitrogen 70 resulting from the dissociation of ammonia 12 may preferentially pass to separate from the ammonia 12. In other words, the barrier 72 may be generally impermeable to ammonia 12 but permeable to nitrogen 68 and hydrogen 70. An exemplary barrier may include a carbon nanotube. Carbon nanotubes, which are members of the fullerene structural family, may be understood as a hexagonal network of carbon atoms that have been formed into an extended length seamless structure (e.g. tube structure).

On opposing sides of the ammonia/hydrogen-nitrogen barrier 72, the reaction chamber includes two outlets 76, 78. Outlet 76 on the ammonia side of the barrier 72 provides ammonia 12 from the reaction chamber 36 through a first fuel supply line 80 where it may be fed to a fuel delivery device, such as comprising at least one direct fuel injector 84, which may be located in the cylinder head, and directly provided (injected) into the cylinder/combustion chamber 86 of the internal combustion engine 100. In other words, the injection nozzle of the fuel injector 84 may be inside the cylinder/combustion chamber 86 and the ammonia 12 may be injected directly into the cylinder/combustion chamber 86 and not pre-mixed with air or other fuel outside the cylinder/combustion chamber 86. Fuel supply line 80 may be configured to withstand a combination of temperature and pressure sufficient to provide ammonia at temperatures at or above 300° C. and pressures at or above 112 bar from vessel 30 to fuel injector 84. Similarly, fuel injector 84 may also be configured to withstand a similar combination of temperatures and pressures for the ammonia feed from supply line 80 to internal combustion engine 100.

Outlet 78 on the hydrogen-nitrogen side of the barrier 72 may provide hydrogen and nitrogen from the reaction chamber 36 through a second fuel supply line 82 where it may be fed to a fuel delivery device, such as comprising at least one indirect fuel injector 88, which may be located in the intake port 90, and indirectly provided (injected) into the cylinder/combustion chamber 86 of the internal combustion engine 100. In other words, the injection nozzle of fuel injector 88 may be outside the cylinder/combustion chamber 86 upstream of the cylinder's intake valve, where the hydrogen and nitrogen mix with air 74 prior to entering the cylinder/combustion chamber 86. Indirect injection may include single-point fuel injection (e.g. throttle-body injection, central fuel injection) or multi-point fuel injection (e.g. sequential fuel injection, tuned port injection). Fuel supply line 82 may also be configured to withstand a temperature of at or above 300° C. and pressure at or above 112 bar from vessel 30 to fuel injector 88. Similarly, fuel injector 88 may also be configured to withstand a similar combination of temperature and pressure for the hydrogen and nitrogen feed from supply line 82 to internal combustion engine 100.

With regards to the hydrogen-nitrogen mixture, it should be noted that the nitrogen, due to its inert properties, does not provide fuel and may be separated from the hydrogen prior to the hydrogen being introduced to the internal combustion engine. Such may become desirable if a nitrogen oxide, such as nitrogen dioxide, is found to be created in the internal combustion engine due to the reaction of nitrogen with oxygen from the air in the presence of heat.

With the foregoing system, the ammonia 12, and the hydrogen 68 (and nitrogen 70) may be injected into cylinder/combustion chamber 86 in selected amounts independently. Injection of the hydrogen 68 and nitrogen 70 into the intake manifold, or alternatively directly into cylinder/combustion chamber 86 before or after or at the same time as ammonia 12 injection into cylinder/combustion chamber 86 may now assist in ignition of the ammonia 12 by igniter 98 and accelerate combustion of the ammonia 12 with sufficient combustion speed.

When ammonia 12 is injected into cylinder, along with the pressure drop, the ammonia 12 may expand and increase the cylinder pressure. With ammonia injection in the presence of air within the cylinder (where the air is delivered by the intake manifold), the number of molecules in cylinder increases about 28% under stoichiometric conditions:

$$4.NH_3 + 3.O_2 + 3\cdot 0.[789/0.211].N_2$$

$$4:3+3\cdot 0.789/0.211 = 0.28:1$$

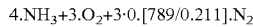

As noted above, the $NH_3$ expansion may be configured herein to be almost adiabatic (95% to 99.9% of the energy not being transferred to the surroundings). This may be achieved as the temperature of ammonia 12 through adiabatic expansion can be maintained above its condensation temperature because of the relatively high initial temperature of ammonia 12 which temperature condition may be supplied by the exhaust gas 60. So, any latent heat absorption from the ammonia expansion to the surroundings is minimal (e.g. less than or equal to 5.0%). In addition, water condensation is also avoided because the temperature does not drop as the absorption of latent energy is generally avoided.

It may also be noted that pressure drop in the cylinder by condensation of ammonia does not occur. Accordingly, to optimize the effective energy, the fuel injection of ammonia and/or hydrogen/nitrogen mixtures herein may be preferentially performed near top dead center of the cylinder.

It may therefore also be appreciated that the engine herein may be "adiabatic". In other words, the engine can be made to inhibit loss of combustion heat to the cylinder walls of combustion chamber 86 of engine 100. This may be accomplished by reducing the thermal conductivity of the cylinder walls of the engine 100 through the use of coatings, such as ceramic coatings or the manufacture of the engine itself from ceramic or other relatively low thermal conductivity materials. In this manner, the temperature of the exhaust gas 60 heating the ammonia 12 may be further increased such that the temperature of the ammonia 12 may reach 500° C.

From the above, the amount of ammonia 12 converted to hydrogen and nitrogen may now be increased. Excess hydrogen beyond which is needed for use with the internal combustion engine 100 may then be stored in a hydrogen fuel tank for use, for example, by the internal combustion engine 100 when the engine is initially started and has not yet achieved sufficient operating temperature to dissociate the ammonia.

Optionally, outlet 92 on the hydrogen-nitrogen side of the barrier 72 may provide hydrogen from the reaction chamber 36 through a third fuel supply line 94, with or without the nitrogen, where it may be used to power a hydrogen fuel cell 96, such as for a hybrid vehicle. The hydrogen fuel cell 96 may use hydrogen as a fuel and oxygen (usually from air) as an oxidant. It may produce electricity from the fuel (hydrogen on the anode side) and an oxidant (oxygen on the cathode side), which react in the presence of an electrolyte. The reactants may flow into the cell, and the reaction products flow out of it, while the electrolyte remains within it.

Figure 3:
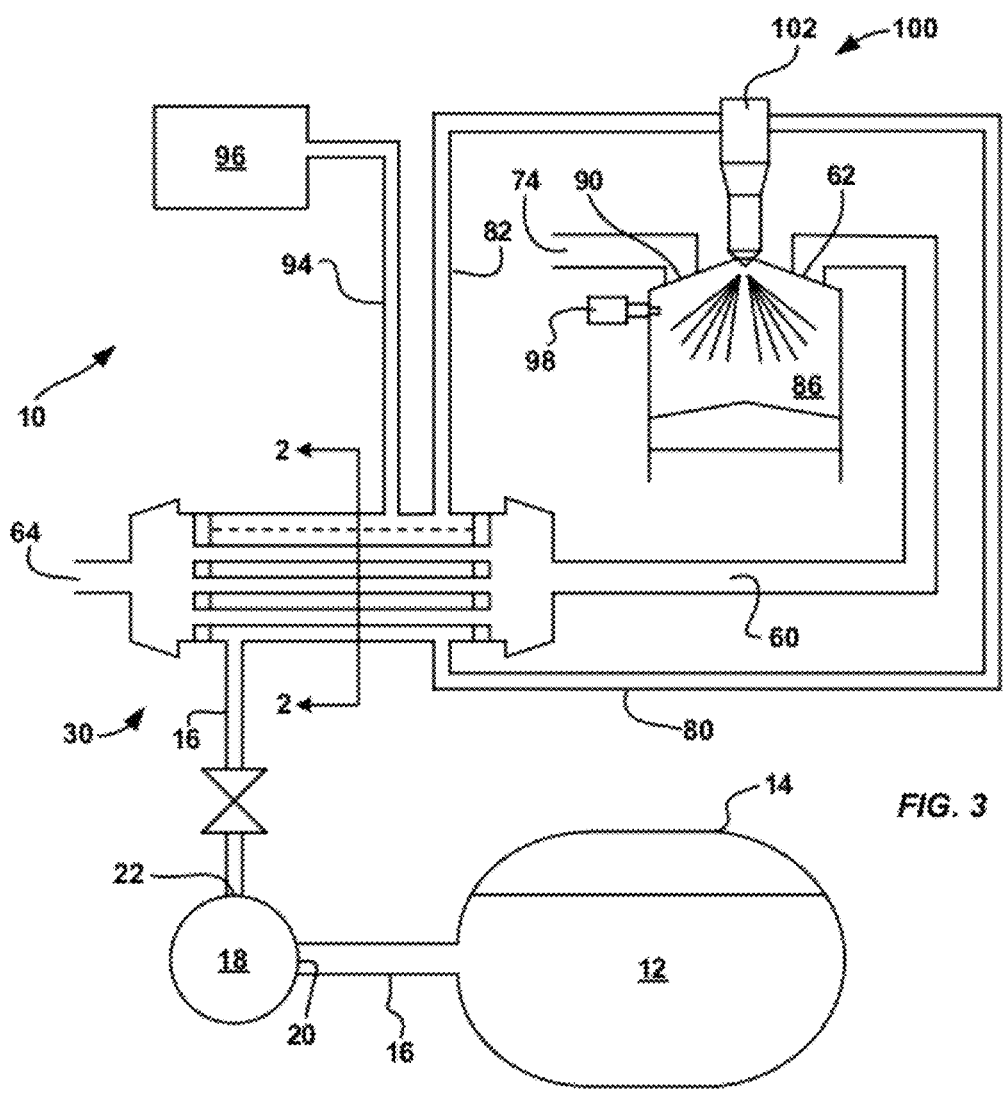
FIG. 3 shows a second embodiment of a fuel system of the present invention.

In the embodiment of fuel injection shown in FIG. 3, both the ammonia 12 via fuel supply line 80 and hydrogen and nitrogen via fuel supply line 82 may be directly injected into the cylinder/combustion chamber 86 of the internal combustion engine 100. That is, both the ammonia 12 and hydrogen-nitrogen mixture may be directly injected into the cylinder/combustion chamber 86 of the internal combustion engine 100 by a common or shared fuel injector 102.

Figure 4:
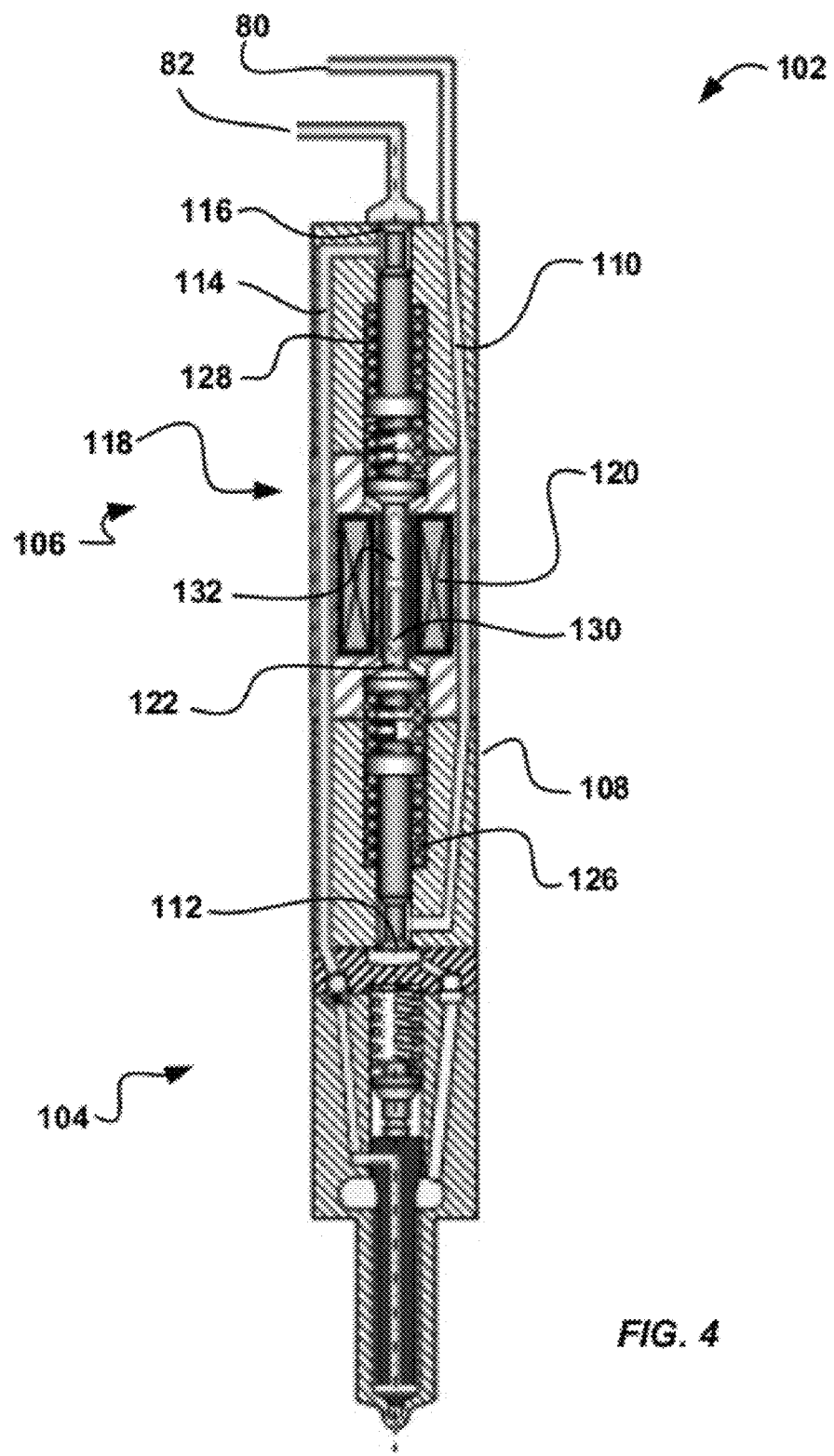
FIG. 4 shows an exemplary fuel injector of the present invention.

As shown in FIG. 4, the fuel injector 102 may optionally comprise an injection nozzle 104 and a switching valve assembly 106. In other words, a valve assembly which switches between separately or independently injecting ammonia and hydrogen (with or without nitrogen). In this manner, the ammonia and hydrogen may be injected in a predetermined sequence, for example, of 1:1. In other words, one injection of ammonia for each injection of hydrogen. However, other sequences are possible such as, for example 2:1 or 1:2. Furthermore, the injection time for the ammonia and the hydrogen may vary, or be kept the same. Consequently, fuel injector 102 offers a wide range of fuel injection alternatives.

Again with reference to FIG. 4, the fuel injector 102 may specifically contain an injector casing 108 which receives fuel from two different fuel sources, examples of which may again be ammonia and hydrogen. The fuel injector 102 comprises a first fuel passage 110 which is closed and opened by a first valve 112, and a second fuel passage 114 which is closed and opened by a second valve 116. As shown, first fuel passage 110 and second fuel passage 114 merge within nozzle 104.

Both valves 112, 116 may be opened by a common, or shared, actuator 118 which, as shown, may comprise an electromechanical solenoid. Electromechanical solenoid comprises a solenoid coil 120 and a solenoid armature 122. Conversely, valves 112, 116 may be closed by first and second closure means comprising first and second valve springs 126, 128, respectively, which equally bias the opening movement of armature 122.

Armature 122 may be moved by a solenoid coil 120, which comprises a coil of metal wire wrapped around a portion of the length of armature 122 and produces a magnetic field when an electric current is passed through the coil 120 which, in turn, causes the armature 122 to move in a known manner.

As shown, when the polarity of the solenoid coil 120 is zero, the armature 122 does not actuate either valve 112, 116 and both valves 112, 116 may be held closed by their respective valve springs 126, 128. However, when the polarity of the solenoid coil 120 is positive (+), the armature 122 may travel in a first direction as shown by arrow 130 towards the first valve 112 and actuates the first valve 112 by pushing on it and overcoming the biasing force of the first valve spring 126, to open the first fuel passage 110 and provide ammonia to the injection nozzle 104 and cylinder/combustion chamber 86. At this time, the second fuel passage 114, here for the hydrogen-nitrogen, is closed.

Alternately, when the polarity of the solenoid coil 120 is negative (−), the armature 122 may travel in a second direction as shown by arrow 132 (opposite the first direction) towards the second valve 116 and actuates the second valve 116 by pushing on it and overcoming the biasing force of the second valve spring 128, to open the second fuel passage 114 and provide hydrogen-nitrogen to the injection nozzle 104 and cylinder/combustion chamber 86. At this time, the first fuel passage 110, here for the ammonia, is closed.

In the above manner, actuator 118 of injector 102 may be configured to actuate (open) first fuel passage valve 112 and actuate (open) second fuel passage valve 116 in a predetermined sequence. For example, injector may be configured to alternate equally between injecting ammonia and injecting hydrogen.

To maximize the benefit of ammonia as a fuel for internal combustion engines, a fuel injector, a fuel system and method of providing fuel to an internal combustion engine have been disclosed that include producing hydrogen from the ammonia through dissociation of the ammonia, and using the hydrogen in the cylinder/combustion chamber of the engine to accelerate ammonia combustion. It should also be appreciated that all of the various embodiments noted herein are interchangeable and features within any of the drawings may be used within each of the respective drawings, to optimize any and all of the disclosed characteristics of the engine and/or fuel consumption described herein.

The foregoing description of several methods and embodiments has been presented for purposes of illustration. It is not intended to be exhaustive and obviously many modifications and variations are possible in light of the above teaching.

What is claimed is:

1. A method of providing fuel to an internal combustion engine, the method comprising:
    providing a source of ammonia wherein said ammonia is at a temperature of greater than or equal to 300° C. and a pressure of greater than or equal to 112 bar;
    dissociating a portion of said ammonia into hydrogen and nitrogen; and
    introducing said ammonia and said hydrogen to an internal combustion engine.

2. The method of claim 1 wherein said ammonia is introduced into said internal combustion engine and said ammonia undergoes an expansion and heat release wherein 95% or more of said heat released due to said expansion is retained by said ammonia.

3. The method of claim 2 wherein said ammonia which has undergone an expansion and heat release is maintained at or above the ammonia condensation temperature of 80° C. at 40 bar.

4. The method of claim 1 further comprising:
    producing exhaust gas from said internal combustion engine; and
    heating said ammonia with said exhaust gas to provide ammonia at said temperature of greater than or equal to 300° C.

5. The method of claim 1 wherein said ammonia is at a temperature of 300° C. to 600° C. and at a pressure of 112 bar to 600 bar.

6. The method of claim 1 wherein:
    introducing the ammonia to the internal combustion engine is performed through at least one fuel injector.

7. The method of claim 6 wherein:
    the at least one fuel injector provides the ammonia to a cylinder of the internal combustion engine.

8. The method of claim 1 wherein:
    introducing the hydrogen to the internal combustion engine is performed through at least one fuel injector.

9. The method of claim 8 wherein:
    the at least one fuel injector provides the hydrogen through an air intake port of the internal combustion engine.

10. The method of claim 1 wherein:
    introducing the ammonia and the hydrogen as fuel to the internal combustion engine is performed through at least one fuel injector configured to introduce both the ammonia and the hydrogen as fuel to the internal combustion engine.

11. The method of claim 10 wherein:
    said internal combustion engine includes a cylinder and the at least one fuel injector configured to introduce both the ammonia and the hydrogen as fuel to the internal combustion engine provides the ammonia and hydrogen to said cylinder of said internal combustion engine.

12. The method of claim 10 wherein:
    the at least one fuel injector configured to introduce both the ammonia and the hydrogen as fuel to the internal combustion engine provides the ammonia and hydrogen through a shared nozzle.

13. The method of claim 10 wherein:
    the at least one fuel injector configured to introduce both the ammonia and the hydrogen as fuel to the internal combustion engine is further configured to separately introduce the ammonia and the hydrogen as fuel to the internal combustion engine.

14. The method of claim 1 further including separating the ammonia from said hydrogen and nitrogen and separately introducing said ammonia and said hydrogen and nitrogen to said internal combustion engine.

15. The method of claim 1 further comprising:
    introducing the hydrogen as fuel to a hydrogen fuel cell.

16. A method of providing fuel to an internal combustion engine, the method comprising:
    providing a source of ammonia wherein said ammonia is heated by exhaust gas from said internal combustion at a temperature of greater than or equal to 300° C. and a pressure of greater than or equal to 112 bar;
    dissociating a portion of said ammonia into hydrogen and nitrogen; and
    introducing said ammonia and said hydrogen to an internal combustion engine wherein said ammonia undergoes expansion and heat release wherein 95% or more of said heat released due to said expansion is retained by said ammonia.

17. The method of claim 16 wherein said ammonia is at a temperature of 300° C. to 600° C. and at a pressure of 112 bar to 600 bar.

18. A fuel system for an internal combustion engine, the fuel system comprising:
    a fuel tank to store liquid ammonia;
    a supply line to deliver said ammonia from said fuel tank to a reaction vessel wherein said vessel is capable of heating said ammonia to a temperature of greater than or equal to 300° C. at a pressure of greater than or equal to 112 bar along with dissociation of said ammonia into hydrogen and nitrogen;
    a first fuel supply line to provide the ammonia from the reaction vessel to said internal combustion engine; and
    a second fuel supply line to provide the hydrogen from the reaction vessel to said internal combustion engine.

19. The fuel system of claim 18 wherein:
the internal combustion engine includes a fuel delivery device; and
the fuel delivery device comprises at least one fuel injector to provide the ammonia to the internal combustion engine.

20. The fuel system of claim 18 wherein:
said internal combustion engine includes a cylinder for fuel combustion and the at least one fuel injector provides the ammonia to said cylinder of the internal combustion engine.

21. The fuel system of claim 18 wherein:
the internal combustion engine includes a fuel delivery device; and
the fuel delivery device comprises at least one fuel injector to provide the hydrogen to the internal combustion engine.

22. The fuel system of claim 21 wherein:
the at least one fuel injector provides the hydrogen through an air intake port of the internal combustion engine.

23. The fuel system of claim 18 wherein:
the internal combustion engine comprises a fuel delivery device; and
the fuel delivery device comprises at least one fuel injector to provide the ammonia and the hydrogen to the internal combustion engine.

24. The fuel system of claim 23 wherein:
the at least one fuel injector alternates between providing ammonia and hydrogen to said internal combustion engine.

25. The fuel system of claim 18 further comprising:
a third fuel supply line to provide hydrogen from the reaction vessel to a hydrogen fuel cell.

* * * * *